United States Patent [19]

Kawasaki

[11] 3,970,874

[45] July 20, 1976

[54] CIRCUITRY FOR CONTROLLING SHUTTER TIME IN ACCORDANCE WITH A MANUALLY ADJUSTABLE RESISTOR

[75] Inventor: Masahiro Kawasaki, Tokyo, Japan

[73] Assignee: Asahi Kogaku Kogyo Kabushiki Kaisha, Tokyo, Japan

[22] Filed: Sept. 6, 1974

[21] Appl. No.: 503,841

[30] Foreign Application Priority Data

Sept. 12, 1973 Japan............................. 48-106923

[52] U.S. Cl.............................. 307/293; 354/235
[51] Int. Cl.² ...................... H03K 5/13; G03B 9/08
[58] Field of Search ........... 307/230, 293; 328/145; 354/50, 51, 60, 235

[56] References Cited

UNITED STATES PATENTS

| 3,231,761 | 1/1966 | Keller et al. ........................ 307/293 |
| 3,365,586 | 1/1968 | Billings ............................... 307/293 |
| 3,808,463 | 4/1974 | Mulder .............................. 307/230 |
| 3,810,203 | 5/1974 | Mori et al. .......................... 354/51 |

Primary Examiner—Stanley D. Miller, Jr.
Attorney, Agent, or Firm—Christie, Parker & Hale

[57] ABSTRACT

An output stage transistor of a control circuit provides a manually adjustable amount of charging current to a timing capacitor. The control circuit is arranged so that the charging current changes by a factor of two for each resistance change by a factor of the square root of two in a manually variable resistor.

3 Claims, 1 Drawing Figure

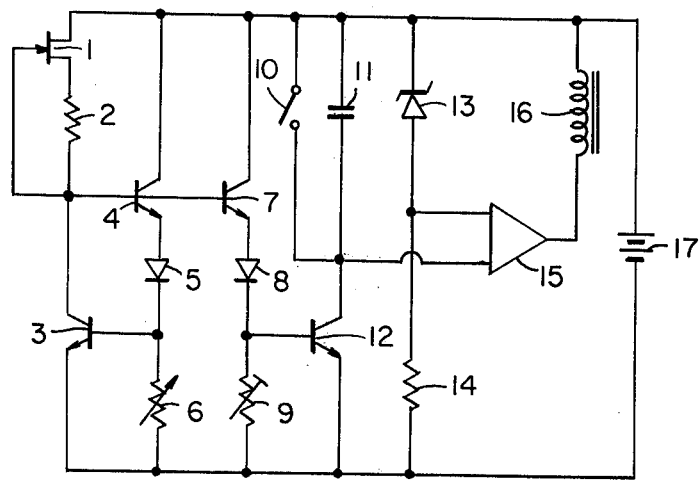

CIRCUITRY FOR CONTROLLING SHUTTER TIME IN ACCORDANCE WITH A MANUALLY ADJUSTABLE RESISTOR

BACKGROUND OF THE INVENTION

In general, this invention relates to camera shutter arrangements; more particularly, it relates to a control circuit therefor which enables manual adjustment of the exposure time of the shutter.

Prior art manual shutter control circuits determine the exposure time depending on the time constant of a series circuit consisting of a capacitor and a variable resistor. It is known, however, that the control circuits of this type involve several disadvantages. The variable resistor can provide only a reduced adjustment accuracy in a low resistance area and hence the control circuit of this type presents an unsatisfactory voltage variation characteristic at low voltages. Furthermore, when it is required to control the shutter time over a wide range, the manual shutter control resistor has to be of such a type that can be varied over a wide range, from a very high resistance value to a very low resistance value. As is well known, it is difficult to manufacture such a resistor. Still another disadvantage involved in the prior art control circuit is that, when semiconductor devices are used, the construction of the circuit becomes complicated and that difficulties are encountered in providing a control circuit having good temperature characteristics because of the cumulative influence of the ambient temperature over the semiconductor devices used.

SUMMARY OF THE INVENTION

This invention is embodied in a camera shutter arrangement of the type including an electromagnet, a timing capacitor, a timing switch for enabling charging current to develop a voltage across the capacitor, and switching circuit means connected to respond to the voltage across the capacitor to switchably energize the electromagnet.

In accordance with the improvement of this invention, there is provided a constant current source that preferably is implemented by a self-bias connected field effect transistor. A first transistor has a base-emitter junction and a collector electrode connected to the constant current source. A second transistor has a base-emitter junction and a collector electrode connected to the capacitor. First and second resistors are each connected in parallel with the base-emitter junction of a respective one of the first and second transistors. First and second current amplification circuit means are provided. The first current amplification circuit means is connected between the constant current source and the first resistor so as to serve as a feedback circuit for the first transistor. The second is connected between the constant current source and the second resistor. Owing to their symmetrical arrangement and similar characteristics, these current amplification means provide good perfomance even under the influence of temperature variations. The currents they respectively supply to the first and second resistors develop voltages across the base-emitter junctions of the first and second transistors. As will be shown in a mathematical treatment below, by manually adjusting the resistance value of one of these resistors there is caused a substantial change in the charging current to the capacitor.

BRIEF DESCRIPTION OF THE DRAWING

The drawing is a block and schematic drawing of the preferred embodiment of this invention.

DETAILED DESCRIPTION

In the drawing, a field effect transistor 1 (hereinafter referred to as FET) is connected in a self-bias circuit in which a resistor 2 is connected across the source and gate electrodes of the FET 1. The resistor 2 is also connected to the collector electrode of an NPN transistor 3. The emitter electrode of the transistor 3 is connected to the negative or ground terminal of a DC power source 17. The positive terminal of the DC power source 17 is connected to the drain of the FET 1. A transistor 4 has its base electrode connected to the gate of the FET 1, its collector electrode connected to the positive terminal of the DC power source 17, and its emitter electrode coupled to the base of the transistor 3 through a diode 5. A manually variable resistor 6 is connected across the base-emitter junction of the transistor 3. In a similar manner to the series circuit of the transistor 4, diode 5 and variable resistor 6, there is provided a transistor 7, diode 8 and semi-fixed resistor 9 which are serially connected to each other and to the DC power source 17. The base of the transistor 7 is connected to the base of the transistor 4.

A timing switch 10 and a timing capacitor 11 are connected to each other and connected at one end thereof to the positive terminal of the DC power source 17 and at the other end thereof to the collector of a transistor 12 which serves a logarithmic expansion function. The transistor 12 has its emitter electrode connected to the negative terminal of the DC power source 17 and its base electrode connected to the junction of the diode 8 and the semi-fixed resistor 9. Thus, the resistor 9 is in parallel with the base-emitter junction of the transistor 12. A Zener diode 13 is connected between the positive terminal of the DC power source 17 and a resistor 14. A conventional switching circuit 15 has two input terminals which are respectively connected to the junction of the Zener diode 13 and resistor 14 and to the junction of the timing capacitor 11 and the collector of the transistor 12. The output of the switching circuit 15 is connected to one end of a shutter actuation electromagnet coil 16. The other end of the coil 16 is connected to the positive terminal of the DC power source 17.

In the shutter control circuit having said construction, the self-bias-connected FET 1 functions as a constant current source, and the transistor 3 receives at its collector electrode a constant current from the FET 1 and a feedback signal is applied to the base of the transistor 3 by way of the current amplifying transistor 4 and the diode 5.

Now the principles and operation of the above-described arrangement will be explained. If the gate-source voltage of the FET 1 is represented by $V_{GS}$ and the resistance value of the resistor 2 is represented by $R_1$, then the source current $i_s$ of the FET 1 will be expressed by the following formula:

$$i_s = V_{GS}/R_1 \ldots \qquad (1)$$

This formula shows that the FET 1 and resistor 2 form a constant current source. The collector current $i_C$ of the transistor 3 is determined by the base-emitter voltage $V_{BE1}$ of the transistor 3 and feedback signal is applied to the base of the transistor 3 by way of the transistor 4, diode 5 and variable resistor 6. Under these conditions the base-emitter voltage $V_{BE1}$ of the transistor 3 will be expressed as $$V_{BE1} = \frac{KT}{q} \log i_S/i_o + V_o \quad (2)$$

where,
K: Boltzmann's constant
T: absolute temperature
$q$ elementary electric charge
$i_o$: constant
$V_o$: base-emitter voltage of the transistor at the time when the collector current $i_C$ is $i_o$.

In Formula (2) if $KT/q$ is represented by $K_1$, then the following formula will be obtained:

$$V_{BE1} = K_1 \log i_S/i_o + V_o \ldots \quad (3)$$

On the other hand, if the resistance value $R_2$ of the variable resistor 6 is represented by $R_2$, then the emitter current $i_1$ of the transistor 4 will be expressed as $$i_1 = V_{BE1}/R_2 \ldots \quad (4)$$

The base-emitter voltage $V_{BE2}$ of the transistor 4 and voltage $V_{D3}$ across the terminals of the diode 5 will be expressed as follows:

$$V_{BE2} = K_1 \log i_1/i_o + V_o \ldots \quad (5)$$

$$V_{D3} = K_1 \log i_1/i_o + V_o \ldots \quad (6)$$

Similarly, if the collector current of the transistor 12 is represented by $i_2$, then the base-emitter voltage $V_{BE4}$ of the transistor 12 will be expressed as $$V_{BE4} = K_1 \log i_2/i_o + V_o \ldots \quad (7)$$

If the resistance value of the semi-fixed resistor 9 is represented by $R_3$, then the emitter current $i_3$ of the transistor 7 will be expressed as $$i_3 \text{ voltage } V_{BE4}/R_3 \ldots \quad (8)$$

Therefore, the base-emitter voltaage $V_{BE5}$ of the transistor 7 and the voltage $V_{D6}$ across the terminals of the diode 8 will be expressed respectively as follows:

$$V_{BE5} = K_1 \log i_3/i_o + V_o \ldots \quad (9)$$

$$V_{D6} = K_1 \log i_3/i_o + V_o \ldots \quad (10)$$

It is found that the shutter control circuit having above-mentioned construction satisfies the following relation.

$$V_{BE1} + V_{BE2} + V_{D3} = V_{BE4} + V_{BE5} + V_{D6} \ldots \quad (11)$$

Substitution of Formula (3), (5), (6), (7), (9) and (10) into Formula (11) will give the following relation:

$$i_2 = (i_S \times i_1^2)i_3^2 \ldots \quad (12)$$

It will be appreciated from this Formula that the collector current $i_2$ of the transistor 12 which serves as a timing current can be doubled by increasing $i_1$ by 2 times while maintaining $i_S$ and $i_3$ at constant levels. In other words, the timing current can be varied in accordance with a geometrical progression of 2 by varying the resistance value $R_2$ of the variable resistor 6 in accordance with the following relation:

$$R_2 = R_o \, 2^{1/2K} \ldots \quad (13)$$

where, $R_o$: constant.

When the timing switch 10 is closed the electromagnet coil 16 is energized by way of the switching circuit 15 to thereby open the shutter. Upon opening the timing switch 10 the capacitor 11 starts to be charged. When the voltage across the capacitor 11 reaches a level corresponding to the voltage across the Zener diode 13, the switching circuit 15 is reversed to deenergize the electromagnet coil 16, so that the shutter is closed and a predetermined exposure time can be obtained.

When a feedback circuit incorporated in the circuit arrangement, the manual shutter control circuit of this invention provides an improved voltage variation characteristic at low voltages. The symmetrical arrangement of the group consisting of the transistors 3 and 4 and diode 5 and the group consisting of the transistors 7 and 12 and diode 8 cancels the influence of the ambient temperature over these devices and thus contributes to improve the temperature characteristic of the circuit. Besides, the shutter control circuit of this invention has an ability of adjusting the shutter time over a wide range by varying the resistance value only within a substantially narrow range.

What is claimed is:

1. In a camera arrangement having a d.c. power source, an electromagnet, a timing capacitor, a timing switch for switchably enabling charging current to flow through the timing capacitor to develop a voltage across the timing capacitor, and switching circuit means connected to respond to the voltage across the timing capacitor to switchably energize the electromagnet, the combination comprising:
 a constant current source;
 first and second transistors each having a base electrode, an emitter electrode, and collector electrode;
 the first transistor having a base-emitter junction between its base and emitter electrode, and having its collector electrode coupled to the constant current source;
 the second transistor having a base-emitter junction between its base and emitter electrodes, and having its collector electrode connected to one end of the timing capacitor;
 the other end of the timing capacitor being connected to one terminal of the d.c. power source, and the other terminal of the d.c. power source being connected to the emitter electrode of the second transistor so that there is defined a circuit loop through which the charging current flows in an amount which depends upon the magnitude of voltage defined across the base-emitter junction of the second transistor;
 first and second resistors;
 the first transistor having its base and emitter electrodes connected to opposite ends of the first resistor so that the first resistor is in parallel-circuit relationship with the base-emitter junction of the first transistor;
 the second transistor having its base and emitter electrodes connected to opposite ends of the second resistor so that the second resistor is in parallel-circuit relationship with the base-emitter junction of the second transistor;

first and second current amplification circuit means having substantially the same current gain, the first current amplification circuit means being connected between the constant current source and the first resistor so as to serve as a feedback circuit for the first transistor, the second current amplification circuit means being connected between the constant current source and the second transistor; and one of said first and second resistors being manually adjustable to control the magnitude of the voltage defined across the base-emitter junction of the second transistor so as thereby to control the amount of charging current flowing through the timing capacitor.

2. The combination of claim 1 wherein the first and second current amplification circuit means each comprise a transistor and a diode.

3. The combination of claim 1 wherein the constant current source comprises a field effect transistor connected in a self-bias circuit.

* * * * *